UNITED STATES PATENT OFFICE.

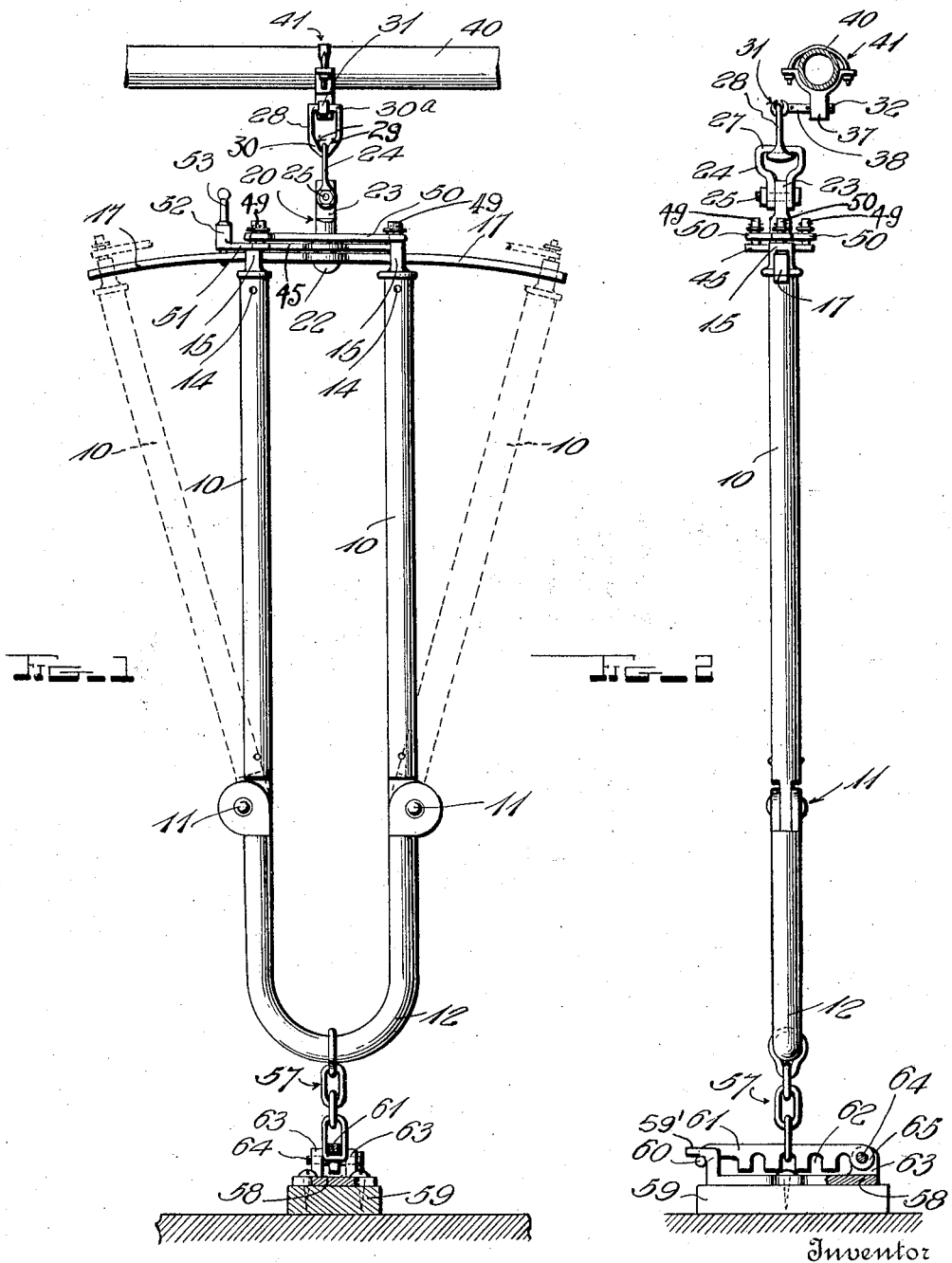

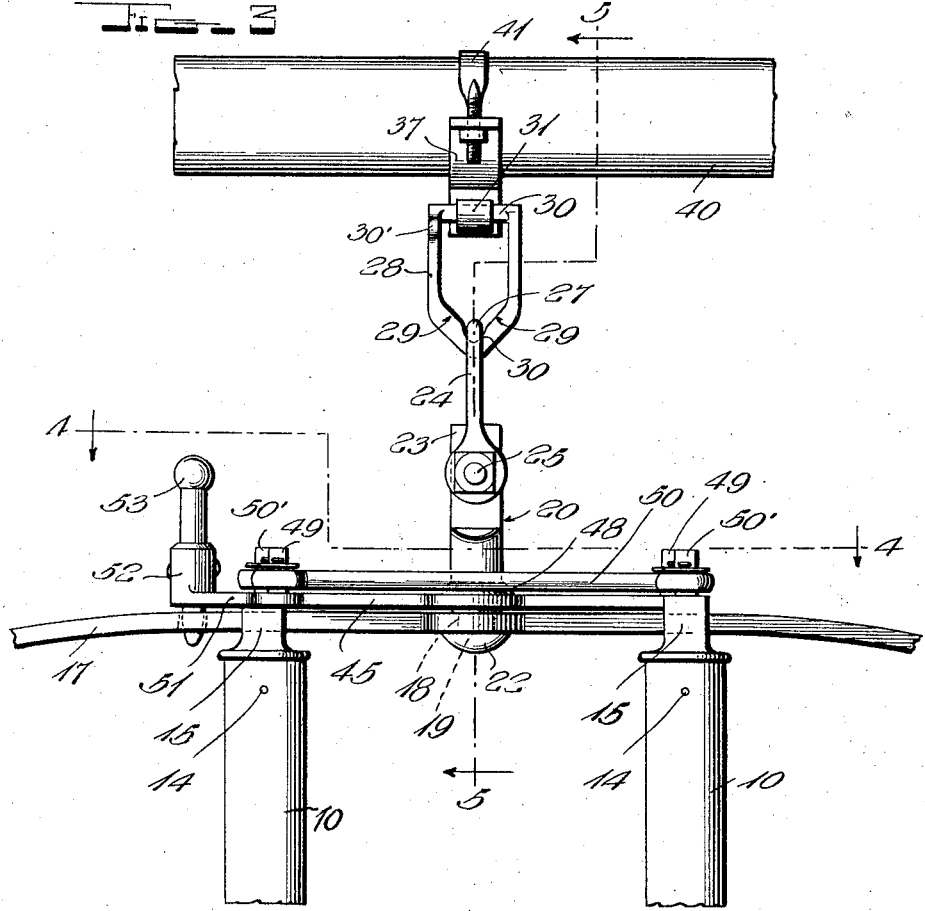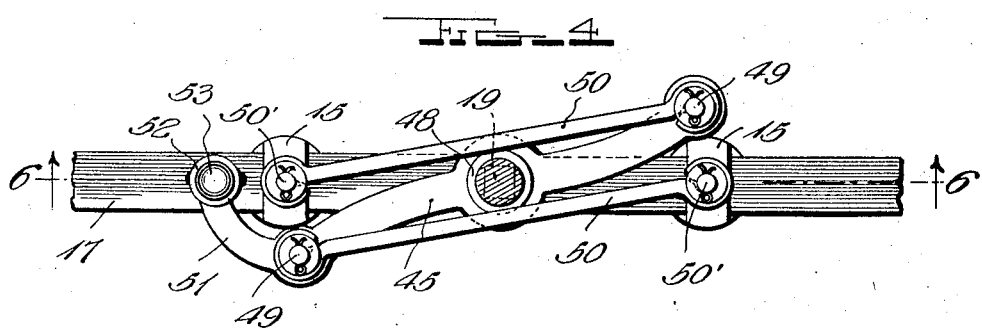

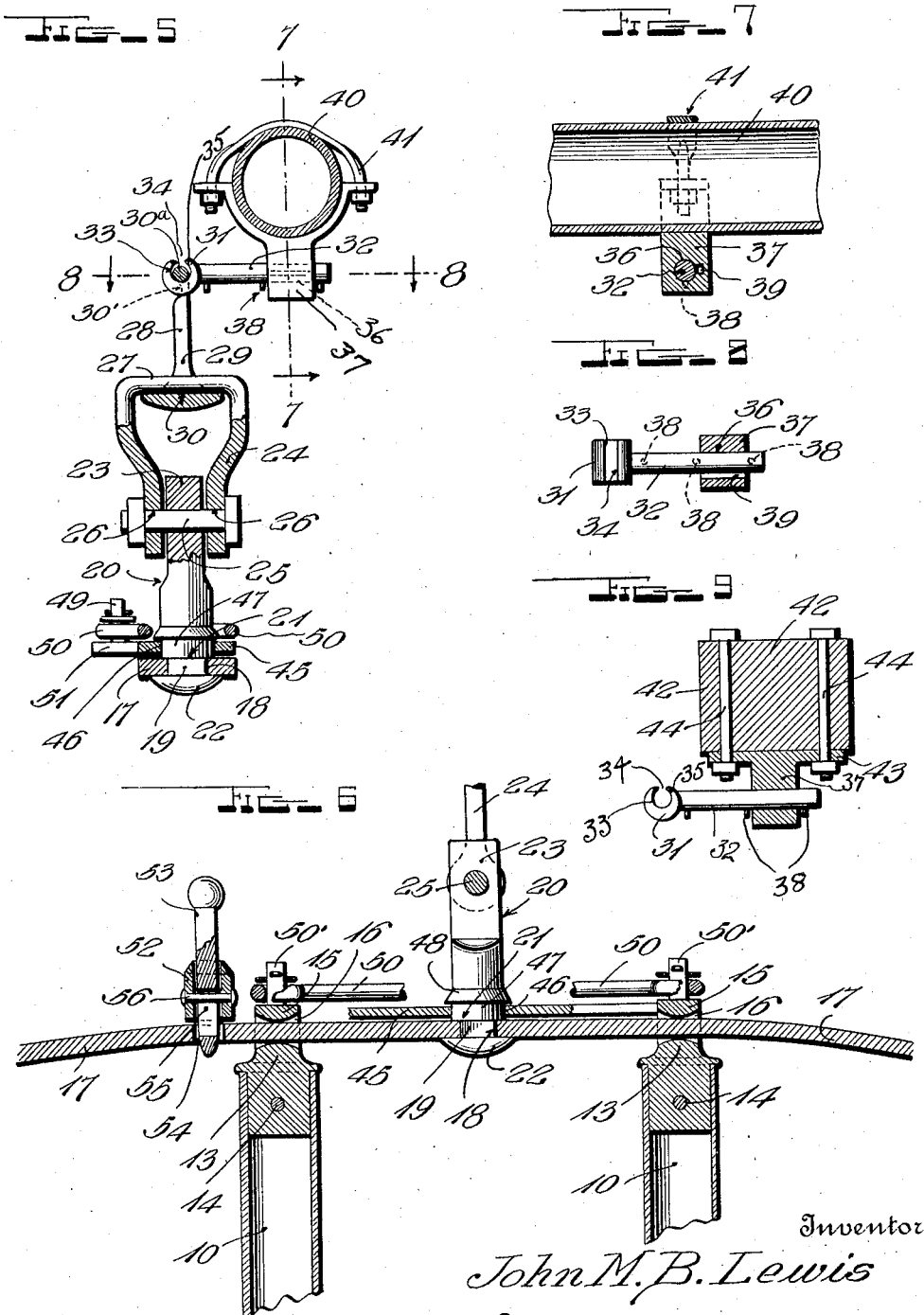

JOHN MINOR BOTTS LEWIS, OF LYNCHBURG, VIRGINIA.

ANIMAL-STANCHION.

1,329,417.  Specification of Letters Patent.  Patented Feb. 3, 1920.

Application filed February 18, 1919. Serial No. 277,778.

*To all whom it may concern:*

Be it known that I, JOHN M. B. LEWIS, a citizen of the United States, residing at Lynchburg, in the county of Campbell and State of Virginia, have invented certain new and useful Improvements in Animal-Stanchions, of which the following is a specification.

My invention relates to improvements in animal stanchions.

An important object of the invention is to provide an animal stanchion which will possess the advantages of the stanchion having only one movable side, and also of the stanchion having both sides movable, but will be free from certain disadvantages encountered in connection with the same.

A form of animal stanchion now in use, is constructed with a relatively stationary arm, and a movable arm to be shifted to opened and closed position. The disadvantages encountered in connection with this form of stanchion is that when the swinging arm is moved to the open position, there is a space at the closed side of the stanchion, thus requiring an additional stall member, commonly known as "sure stop" or "go right", to prevent the animal from passing between the stationary arm of the stanchion and the upright of the stall.

Stanchions are also in use, wherein both arms are pivoted at their lower ends so that they can be swung outwardly to the open position. In this form of stanchion, a single upright post is sufficient for each stall dispensing with the use of the "sure stop" or "go right". However, when a stanchion of this character is open, it is possible for the cow to easily walk through the stanchion. This type of stanchion is desirable in as much as it enables the stalls to be constructed larger, giving the cow more room and freedom of movement, and providing a cheaper stall, since the "sure stops" are dispensed with. However, this type of stanchion is objectionable since, as far as I am aware, no means has been provided to prevent the cow from walking through the stanchion.

In accordance with my invention, I provide a stanchion embodying a pair of movable arms, connected at their lower ends with a member, which is adapted to serve as an impediment or obstruction to prevent the cow from walking through the stanchion. By this means, the advantages of both forms of stanchions above referred to are utilized, while their disadvantages are dispensed with.

In the accompanying drawings forming a part of this specification, and in which like numerals are employed to designate like parts throughout the same;

Figure 1 is a side elevation of a stanchion embodying my invention, showing the same in a closed position;

Fig. 2 is an edge elevation of the same;

Fig. 3 is an enlarged side elevation of the upper end of the stanchion, parts being broken away;

Fig. 4 is a horizontal sectional view, taken on line 4—4 of Fig. 3;

Fig. 5 is a vertical sectional view, taken on line 5—5 of Fig. 3;

Fig. 6 is a vertical sectional view, taken on line 6—6 of Fig. 4;

Fig. 7 is a detail section, taken on line 7—7 of Fig. 5;

Fig. 8 is a detail section, taken on line 8—8 of Fig. 5; and,

Fig. 9 is a detail section, showing a slightly different form of attaching member.

In the drawings, wherein for the purpose of illustration is shown a preferred embodiment of my invention, the numeral 10 designates the oppositely arranged arms or sides of the stanchion. These arms are preferably pivoted, at their lower ends, as shown at 11, with a preferably U-shaped impeding element 12. This impeding element may be formed in any other suitable shape and any other suitable connection may be provided between it and the arms 10. It is thus seen that the arms 10 are pivoted to the impeding element 12, and are thereby pivoted at points spaced a substantial distance from the lower end of the stanchion. This is an important feature of the invention, for when the arms 10 are swung to the open position, as indicated by the dotted lines in Fig. 1, the impeding element 12 will prevent the cow from walking through the stanchion.

The arms 10 are preferably tubular and at their upper ends, receive coupling-plugs 13, held therein by transverse pins 14 or the like. These coupling-plugs are provided with heads 15, having transverse openings 16, receiving a preferably longitudinally curved transverse support-bar 17. The outer portions of this support-bar are curved in arcs of circles which are concentric with the pivots 11, as shown.

The support-bar 17 is provided at a point preferably equi-distantly spaced from the ends thereof with an opening 18, which is preferably formed square in cross section for receiving a square portion 19 of a suspension element 20. Above the support-bar 17, this suspension element has a shoulder 21, and below it a head 22 is formed by flattening or hammering the end of the portion 19. The suspension element 20 is provided at its upper end with a flat portion 23, adapted for insertion within a lower inverted approximately U-shaped link 24, and apertured for pivotally receiving a bolt 25, passing through apertures 26 in the lower link 24. This lower link has an upper transverse portion 27, extending within and transversely of an upper link 28, having inclined or cam faces 29, and a groove 30, receiving the transverse portion 27, as shown. It is thus seen that should the stanchion be turned upon its longitudinal axis the support-bar will turn the supporting element 20, whereby the link 24 will cause it transverse portion 27 to ride upon the cam faces 29. As soon as the stanchion is released, these cam faces will automatically return it to the proper transverse position.

The upper link 28 is provided with a transverse member 30$^a$ and an opening or notch 30', near and beneath the transverse member 30$^a$. The transverse member 30 is adapted for insertion within a head 31, of an upper supporting member, carried by a shank 32. The head 31 has a cylindrical opening 33, having a contracted upper opening 34. When the upper link 29 is inverted, so that the opening or notch 30' will receive the jaw 35, the transverse portion 30$^a$ may be inserted within the opening 34, subsequently to which the link 28 is swung downwardly. It is thus seen that it will be impossible for the link 28 to be separated from the head 31 until it is again inverted, but this link is free to partake of restricted swinging movements, longitudinally of the stall.

The shank 32 is adapted to be adjustably mounted within an opening 36, formed in a support block 37. The shank 32 also carries spaced pins 38, for insertion within a groove 39, which is horizontally arranged. The shank 32 may be inserted within the opening 36 when the pins 38 are positioned to enter the groove 39, and the shank 32 is then turned so that these pins assume a vertical position, thereby positively preventing longitudinal displacement of the shank. The shank however is free to partake of slight turning movement. The support block 37 is secured to a pipe rail 40 by a U-shaped member 41, as shown. When the rail 40 is not used, the beam 42 may be substituted therefor, (see Fig. 9) and the support block 37 will then be equipped with a flat base 43 apertured for receiving bolts 44, as shown.

Means are provided to shift the arms 10 to the opened and closed positions, comprising a lever 45, provided at a point equi-distantly spaced from the ends thereof with a cylindrical opening 46, pivotally receiving a cylindrical portion 47 of the supporting element 20, there being a flange or shoulder 48 above the same. The opposite ends of this lever 45 are apertured for receiving pivot elements 49 having pivotal connection with links 50, the opposite ends of which are pivoted to studs 50', rigidly secured to the heads 15. At one end of the lever 45, there is an extension 51, preferably formed integral therewith, and this extension is equipped with a tubular head 52. This tubular head slidably receives a vertically movable bolt 53, adapted to enter a vertical opening 54 in the transverse support-bar 17. The bolt 53 has a longitudinal slot 55, receiving a transverse pin 56, which prevents its displacement.

At it lower end, the impeding element 12 has suitable connection with a chain or flexible anchor element 57 which is adjustably connected with an anchor device to be now described. This anchor device extends longitudinally of the stall and embodies a base plate 58, which is bolted or otherwise rigidly secured to the ledge 59 of the floor of the stall. This base plate is provided at one end with L-shaped members or knuckles 59', adapted to receive therebeneath a transverse head 60, formed upon an upper bar 61. This upper bar has a series of openings or notches 62, spaced longitudinally of the same, for receiving the lowermost link of the chain. At its opposite end the base plate 58 is provided with a pair of spaced apertured knuckles 63 receiving a bolt 64, passing through a knuckle 65 on the bar 61. It is thus seen that the upper and lower connections for the stanchion may be adjusted longitudinally of the stall.

The operation of the apparatus is as follows:

When the lever 45 is swung to the position shown in Figs. 1 and 4, the bolt 53 will enter the opening 54 and the arms 10 will be locked in a closed position. When it is desired to open the arms 10, the bolt 53 is elevated from within the opening 54, and may serve as a handle for swinging the lever 45 upon its pivot, to shift the arms 10 to the opened position. When in the open position, as indicated by the dotted lines in Fig. 1, the impeding element 12 will serve to effectually prevent the cow from walking through the stanchion, while the two arms are swung outwardly sufficiently to close the spaces between the stanchion and the sides of the stall, thereby dispensing with the employment of "sure stops."

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, I claim:

1. An animal stanchion of the character described, comprising an approximately U-shaped impeding element, a pair of spaced arms connected with the upper ends of the approximately U-shaped impeding element and adapted to be shifted to opened and closed positions with relation thereto, the impeding element preventing the cow from walking through the stanchion when the arms are in the opened position, and means connected with the arms for supporting the stanchion.

2. An animal stanchion of the character described, comprising a loop-member having oppositely arranged sides, said sides comprising arms which are pivoted at their lower ends at points spaced a substantial distance from the lower end of the loop, whereby the lower portion of the loop-member serves as an obstruction to prevent the cow from walking through the stanchion when the sides are in the opened position, such lower portion of the loop serving to receive the neck of the cow while reclining, and means for supporting the stanchion.

3. An animal stanchion of the character described, comprising an approximately U-shaped impeding element, a pair of arms pivotally connected with the upper end of the impeding element so that both arms may be swung outwardly transversely of the stall with relation to the impeding element which then serves to prevent the cow from walking through the stanchion, supporting means connected with the uper ends of the arms, and anchor means connected with the lower end of the stanchion.

4. An animal stanchion of the character described, comprising a pair of spaced arms means to pivotally connect the lower end portions of the arms, a transverse support-bar arranged near the upper ends of the arms and having a slidable engagement therewith, an operating lever pivoted between its ends with the support-bar, means connecting the ends of the operating lever with the upper ends of said arms, means to lock the operating lever to the support-bar, and means to support the support bar.

5. An animal stanchion of the character described, comprising a pair of spaced arms, means to pivotally connect the lower end portions of the arms, a transverse support bar arranged near the upper ends of the arms and having a slidable engagement therewith, an operating lever pivoted between its ends with the support bar, means connecting the ends of the operating lever with the upper ends of said arms, a bolt carried by the operating lever and adapted to engage within an opening in the support bar, supporting means connected with the support bar, and anchor means connected with the lower ends of the arms.

6. An animal stanchion of the character described, comprising a pair of spaced arms, means to pivotally connect the lower end portions of the arms, a transverse support-bar arranged near the upper ends of the arms and having a slidable engagement therewith, a supporting element connected with the support bar, an operating lever pivoted between its ends upon the supporting element and provided at one end with an extension having a substantial vertical socket, a bolt movably mounted within the socket to engage within an opening within the support bar, and means connecting the end portions of the operating lever with the upper ends of the arms.

7. In an animal stanchion, as a sub-combination, anchor means comprising a base plate, a bar arranged above the base plate and extending longitudinally thereof and provided with a series of spaced notches, means detachably connecting one end of the bar with the corresponding end of the base plate, and means securely connecting the opposite end of the bar with the corresponding opposite end of the base plate.

8. In an animal stanchion, as a sub-combination, a transverse support bar provided with an opening, an operating lever pivotally connected with the support bar and provided near one end with a socket, and a bolt mounted to slide within the socket for movement into and out of the opening.

In testimony whereof I affix my signature in presence of two witnesses.

JOHN MINOR BOTTS LEWIS.

Witnesses:
J. W. ARTHUR,
J. W. DILLARD.